Sept. 1, 1959
K. FISCHER ET AL
2,902,455
METHOD FOR PRODUCING CATALYSTS
Filed March 9, 1954
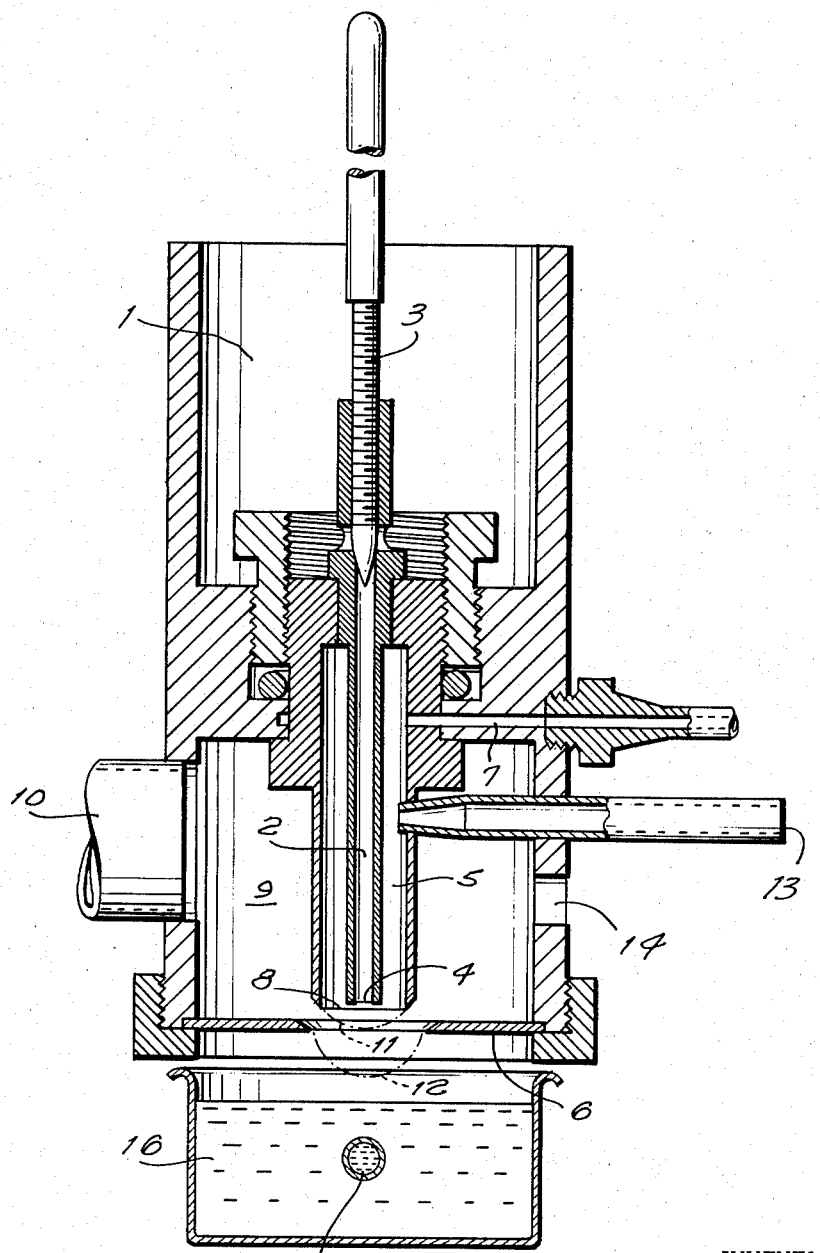
INVENTORS
Karl Fischer, Herbert Sydow and
BY Ernst Streckebach

2,902,455
METHOD FOR PRODUCING CATALYSTS

Karl Fischer, Hamburg-Blankenese, and Herbert Sydow and Ernst Streckebach, Hamburg, Germany, assignors to Deutsche Erdöl-Aktiengesellschaft, Hamburg, Germany, a corporation of Germany Application March 9, 1954, Serial No. 415,114

Claims priority, application Germany March 11, 1953

1 Claim. (Cl. 252—448)

The present invention relates to a new method and apparatus for producing catalysts, and more particularly, catalysts of spherical shape.

Various methods of producing such catalysts are known. One group of such methods proceeds from the sol of the basic catalytic substance and adds it in the form of small droplets to a liquid which does not mix with water, preferably oil. This causes a conversion of the sol into a gel, resulting in small solid spherical bodies. Since a proper solidification of the sol requires it to be left in the liquid, for example, oil, for a certain length of time, the droplets are generally passed from above downwardly through a column of liquid of relatively great height. This type of method has the disadvantage of being very expensive because of the large apparatus required for it. Also, due to length of time required for obtaining complete solidification of the sol, such method is limited in its application to sols of a particular variety. This is due to the fact that a sol, the droplets of which must be passed for an excessive length of time through the oil column until they eventually solidify, would require a column of such height as to be unfeasible in actual practice.

It is the principal object of the present invention to devise a new method of producing spherical catalysts in a more economical manner than was possible according to the previously known methods.

According to the invention, it has been found that the conversion of the sol into gel may be carried out very simply and easily by first enclosing the little sol droplet in a coating which can be hardened, and by then passing it into a suitable bath of liquid for such hardening of the enclosing coating. This method is preferably carried out by means of a double nozzle by passing the sol through the first nozzle and by then passing the sol droplets emerging from the first nozzle into the opening of the second nozzle and enclosing the droplets therein with a thin liquid membrane which is suitable to separate the outer casing which can be precipitated from the inner droplet.

Another important feature of the invention resides in enclosing the sol droplets with a solution or swelling of an alginic acid derivative which is water insoluble or swellable, and in then dropping the small enclosed balls into a precipitation bath. For such precipitation bath, solvents may be used in which the alginic acid derivatives are insoluble. Such liquid may be, for example, an alcohol of a low boiling point. Also, acid baths may be used whereby the water soluble alginic acid derivatives may be converted into water insoluble alginic acid. Most suitable for this purpose are salt baths with cations which form insoluble salts with the alginic acid. Such baths particularly include solvents of salts of the alkaline earth metals or of salts of the rare earth metals or the heavy metals. However, the precipitation may also be carried out in a gaseous or vaporous atmosphere, i.e. in vaporized acids, for example, hydrochloric acid or formic acid, or in sprayed solutions of suitable acids or salts.

By enclosing the sol droplets and by hardening the coating, the little sol spheres become so stable that, even though the sol itself has not as yet been hardened, they can be treated by mechanical means. For example, they may be taken from the bath and placed on conveyor belts and draining screens, or they can be agitated in the precipitation bath itself, or be taken from one precipitation bath to another. Because of the external hardening, the time required for solidifying the sol is of no concern, and such time may be extended to last almost indefinitely, i.e. anywhere from fractions of a second to hours, days, or even weeks.

The independence of the new method from the time required for the solidification also allows the use of many entirely new variations in the composition of the sol and in its treatment for producing a highly active body. This is of particular advantage as regards the use of sols which may harden into gels and have extreme degrees of concentration, and therefore require extreme lengths of time for solidifying. The new method also permits the sol and/or the gel, while still in an aqueous condition, to be subjected to an additional chemical treatment or to be impregnated with other substances. For this purpose, the respective treating or impregnating substance is diffused through the solidified film or membrane into the sol or gel in an aqueous solution or in a solvent which can be mixed with water. Also, if desired, undesired substances such as, for example, alkalies, may be washed out of the gel while still containing water without thereby affecting the structure which it has already attained.

The coating substance according to the invention may consist of any material which is soluble in a solvent or capable of swelling insofar as they can be quickly precipitated by a second bath or in a gaseous or vaporous atmosphere, such as, for example, pectin derivatives, swellable cellulose derivatives, etc. For this purpose, as previously stated, aqueous solutions or swellings of water soluble alginic acid derivatives, for example, of the alkali salts of alkinic acid, may preferably be used. Solutions of depolymerized alginates may also be used which are obtained by reduction or oxidation of acid or alkaline solutions of suitable alginates.

For facilitating the coating or encasing process, the solutions or swellings of such coating substances may also be charged with additions of salts so as to reduce the difference in density between the sol which is to be encased and the solution of the coating substance. A content of, for example, 1 to 15% of sodium chloride within the coating substance has been found suitable for this purpose.

The solidification of the coating substance in a gas, a bath, or a sprayed solution may also be coupled with an impregnation of the body of the catalyst. Such impregnation may, for instance, be controlled by the concentration of the precipitating solutions used and/or by the concentration of the impregnation substance contained therein, as well as by the length of time such material is permitted to act.

In carrying out the invention, additional features thereof have been found extremely suitable which lead to the formation of an intermediate layer between the sol and, for example, the alignate film or membrane. It has been discovered that such intermediate layer will prevent the penetration of the coating substance into the sol. For this purpose, the sol may be given a pH value of, for example, less than 6. When the alginate then comes in contact with the acid solution, the insoluble alginic acid is freed, and at the surface separating the sol to be encased from the alginate solution an adequate solidification already occurs during the formation of the droplets.

Another method according to the invention of obtaining a separating layer consists in the application of suitable technical means for inserting a layer of a liquid which does not mix with water between the alginate layer and the sol while the formation of the droplets is taking place. Generally, when a droplet falls into the hardening bath, the separating film or membrane bursts and then contracts to form a little ball. If before drying the gel is to be washed, impregnated and/or chemically treated, such bursting and running together of the film may be desired. If, however, the coated sol or gel after being added by droplets into the alginate precipitation bath is to be protected from any effects of the bath, the separating film or membrane should be saved until the beginning of the drying stage. This may be done according to the invention by adding suitable surface active agents. The important point to consider is that neither the coating nor the intermediate layer will contain any ingredients which might unfavorably influence the composition of the catalyst or which might become undesirably effective in the subsequent activation of the coated catalyst. The admixture of ingredients to the sol as such for the purpose of forming a separating film or membrane has therefore been found inadvisable.

It is therefore a further object of the invention to determine a new method and means for producing such separating film or membrane. This may be done according to the invention by separately adding a liquid which does not mix with water, preferably oil, and which will burn off in a subsequent treatment of the catalyst. This embodiment of the invention is applicable especially to alkaline sols.

The new method according to the invention for the formation of an intermediate film or membrane is preferably carried out by an apparatus in which several tubes are placed within each other with their discharge openings closely one above the other, so that the sol will first drop upon a membrane consisting of the separating fluid, will hereby be completely enclosed by a film or membrane consisting of such fluid, and then drop upon another opening where it may be caught, for example, by an alginate membrane and be encased thereby.

These as well as still further objects, features, and advantages of the present invention will appear in detail from the following description thereof and the accompanying drawing which illustrates one embodiment of the apparatus for carrying out the new method.

Referring to the drawing, an essential element of the apparatus consists in a nozzle tube 2 which is surrounded by a tubular chamber 5 which, in turn, is surrounded by a chamber 9. The relative arrangement of the three interengaging tubes 2, 5, and 9 is such that the discharge opening of each succeeding tube lies a small distance below the preceding smaller sized tube. The inner tube 2 may be filled with the sol which upon emerging from the opening 4 passes through the discharge opening 8 of the surrounding tube 5 on which discharge opening a membrane, for example, of oil, is suspended as indicated in dotted lines in the drawing. The little sol droplet is then completely encased by such membrane, and drops upon the next following opening 11 of the surrounding tubular chamber 9 which carries a film 12, for example, of alginate. This alginate film 12 which is freely suspended from the opening 11 forms thereon when the alginate emerges through the annular space intermediate the bottom plate 6 and the lower edge of the tube 5. It completely encases the sol droplet 15 in the form of a second coating, and the droplet then drops with such coatings thereon into the bath 16 below.

The sol is preferably fed to the tube 2 from a container 1, and the supply is regulated by a control spindle 3. The oil supplied to the intermediate tube 5 enters the apparatus through a conduit 7, and such supply may be regulated by any suitable means not shown in the drawing. The outer chamber 9 is filled with alginate through a conduit 10 and the amount supplied thereto is likewise regulated by suitable outside means. The proper operation of the apparatus further requires the provision of a conduit 13 for compensating the pressure in the intermediate tube 5, and a suitable conduit or opening 14 in the outer wall of the surrounding chamber 9 for compensating the pressure therein.

The droplet 15 successively emerging from the tubular openings 4, 8, and 11 falls into the bath 16 below the apparatus.

The identical apparatus may also be used if a separating film or membrane is not to be applied upon the droplet.

The following examples are presented to illustrate specific applications of the method according to the invention.

*Example 1*

A sol containing 135 g. of $SiO_2$ and 15 g. of $Al_2O_3$ per liter was adjusted to a pH-value of 3 by means of diluted sulfuric acid and formed in a nozzle device according to the invention into a droplet coated with alginate.

The alginate solution applied consisted of a 2.5% solution of a highly polymeric sodium alginate, and the precipitation was carried out in a 10% solution of $AlCl_3$.

The alginate coating which immediately solidified upon dropping into the bath rendered the still liquid droplets so well capable of being further handled that a few minutes later they could be taken out of the bath and additionally treated. After the sol had hardened, the droplets were washed and dried at 50° C. and subsequently activated at temperatures up to 700° C., whereby the alginate coating which still remained thereon was burned off. The final result consisted of hard porous balls of almost mathematically spherical shape and with good catalytic activity.

*Example 2*

A solution as described in Example 1 was adjusted to a pH-value of 9.5 and dropped from a double nozzle as previously described and, while the droplets were forming, a light oil was added between the two layers in a quantity sufficient to enclose the inner ball. The oil facilitated the formation of the droplets and also prevented the mixable liquids to intermix during the dropping step.

After the droplets had fallen into the precipitation bath, the coating was solidified so that even after destroying the oil film at the intermediate surface, there was no longer any danger that the substances might intermix. The subsequent treatment of the catalyst balls after the coating had solidified was the same as described above in Example 1.

While we have described our invention with reference to a preferred embodiment thereof, we wish it to be understood that our invention is in no way limited to the details of such embodiment or to the specific examples described but is capable of numerous modifications within the scope of the appended claim.

What we claim is:

A process of producing solid catalysts of spherical shape, comprising the steps of enveloping individual droplets of an aqueous sol of catalytically active particles of $SiO_2$ and $Al_2O_3$ adapted to be sintered, in a thin film of light oil; coating said film-covered droplets with an aqueous solution of a highly polymeric sodium alginate, said film preventing substantial contact between said sol and the thus-formed coating; passing said coated film-covered droplets into a solution of $AlCl_3$ adapted to transform said sodium alginate into a water-insoluble alginate, thereby transforming said coated film-covered droplets into semi-solid substantially spherically-shaped bodies; drying said semi-solid bodies so as to form granular spherically-shaped bodies; and heating said spherically-shaped granular bodies to red heat, thereby sintering together said catalytically active particles and burning off said insoluble alginate and said oil, thus forming solid catalysts of spherical shape.

(References on following page)

References Cited in the file of this patent

UNITED STATES PATENTS

| | | |
|---|---|---|
| 2,013,670 | Robinson | Sept. 10, 1935 |
| 2,092,903 | Benner et al. | Sept. 14, 1937 |
| 2,370,200 | Shabaker | Feb. 27, 1945 |
| 2,449,664 | Marisic | Sept. 21, 1948 |
| 2,450,394 | Brown et al. | Sept. 28, 1948 |
| 2,490,260 | Ehrhardt | Dec. 6, 1949 |
| 2,633,454 | Rex et al. | Mar. 21, 1953 |
| 2,733,220 | Wankat | Jan. 31, 1956 |